(12) United States Patent
Babin

(10) Patent No.: US 7,655,319 B2
(45) Date of Patent: Feb. 2, 2010

(54) PLASTIC POSITIONING PIN FOR OVERMOLDED PRODUCT

(75) Inventor: Brian G. Babin, Bristol, IN (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 379 days.

(21) Appl. No.: 11/701,570

(22) Filed: Feb. 2, 2007

(65) Prior Publication Data

US 2008/0187614 A1  Aug. 7, 2008

(51) Int. Cl.
*B29B 11/06* (2006.01)
(52) U.S. Cl. ............... 428/542.8; 425/233; 264/254
(58) Field of Classification Search ............ None
See application file for complete search history.

(56) References Cited

U.S. PATENT DOCUMENTS 6,206,638 B1 * 3/2001 Glynn et al. ............ 416/97 R
6,334,361 B1    1/2002 De Volder et al.

* cited by examiner

*Primary Examiner*—Ling Xu

(57) ABSTRACT

An overmolded electronic device includes a pre-mold assembly having a positioning pin that extends upward through a mold material into contact with an inner cavity of a mold. The positioning pin is disposed within a containment area that is defined by sets of ribs configured in and conformed on the pre-mold assembly. The positioning pin thereby is sealed within the containment area that is in turn sealed from the remainder of the electronic device that prevents the intrusion of moisture or other contaminants into undesirable locations of the electronic device.

22 Claims, 2 Drawing Sheets

PLASTIC POSITIONING PIN FOR OVERMOLDED PRODUCT

BACKGROUND OF THE INVENTION

This invention generally relates to features for controlling contaminant intrusion into an overmolded product.

Electronics and other sensitive devices that are utilized in exposed environments are typically overmolded with plastic or other settable materials to protect against moisture and other contaminants that could possibly cause damage. The protective overmold is formed by first inserting and positioning the devices within a mold cavity, and filling that cavity with molten plastic around the device. The device is held in place during the overmolding operations to prevent undesirable shifting caused by the pressures experienced during injection of plastic into the cavity. Conventional overmolded devices will include a positioning pin that contacts the surface of the mold cavity to maintain a desired position of the device during the molding process. The positioning pin is often part of a pre-mold formed over a portion of the electronic device.

Disadvantageously, the positioning pin necessarily extends through the overmold creating a seam between the positioning pin and overmold that creates a path that could allow intrusion of moisture or other contaminants. It is known to create tortuous paths through complex shaped positioning pins. However, such shapes increase cost and restrict the placement of the positioning pin.

Accordingly, it is desirable to design and develop a device and process for holding an overmolded item in place that effectively seals any potential leak paths and provides greater placement options.

SUMMARY OF THE INVENTION

An example pre-mold assembly for an overmold includes a positioning pin for aligning the pre-mold assembly within a mold. The pre-mold includes a first set of ribs and a second set of ribs on opposing sides of the positioning pin to prevent contaminant intrusion.

The example pre-mold assembly includes a positioning pin that extends through an overmold material into contact with a portion of a mold to align the pre-mold as desired. The pre-mold includes first and second sets of ribs disposed on opposite sides of the pin. The ribs are not part of the pin but instead part of the pre-mold and positioned on either side of the positioning pin to prevent intrusion of contaminants that may penetrate through the interface of the positioning pin and the overmold material.

The ribs define a tortuous path that substantially prevents contaminants from passing the ribs. Further, the ribs may also form a material that melts in response to the overmolded material during injection. The ribs may melt and then intermingle with the overmolded product creating a barrier to moisture or other contaminants that may intrude and leak through the interface between the overmolded product and the pre-mold in the vicinity of the positioning pin.

Accordingly, the pre-mold assembly according to this invention provides for the positioning of a pre-mold assembly within a mold cavity while also providing for the isolation and prevention of contaminants from intruding into protected areas of a device.

These and other features of the present invention can be best understood from the following specification and drawings, the following of which is a brief description.

DETAILED DESCRIPTION OF THE PREFERRED EMBODIMENT

Figure 1:
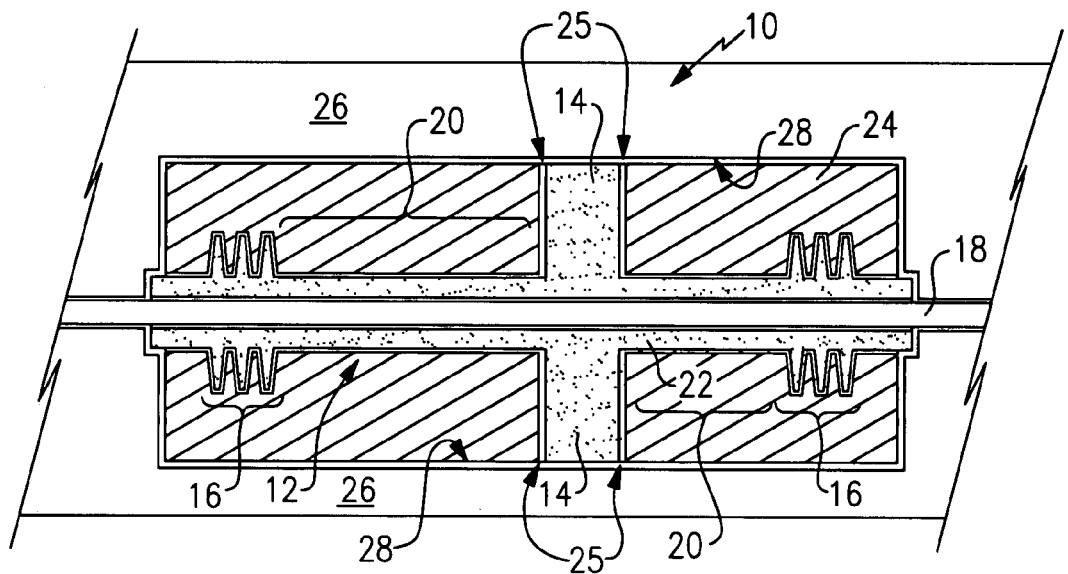
FIG. 1 is a cross-sectional view of an example overmolded assembly according to this invention.

Referring to FIG. 1, an overmold assembly 10 includes a pre-mold 12. The pre-mold 12 includes positioning pins 14 that extend through overmold material 24. The pre-mold 12 is formed from a first settable material and the over material 24 is formed from a second settable material. The example first and second settable materials are plastics that are initially injected in a molten state and latter solidify in a desired shape defined by a mold cavity. The example first and second settable materials can be of the same composition, or may comprises settable materials of different compositions that are compatible with the overmolding process. The positioning pins 14 are provided to abut a mold surface 28 to position the pre-mold assembly 12 within a mold 26. The example pre-mold assembly 12 protects the electric conductors 18 from damage during handling prior to molding and also provides alignment within the mold 26. The pre-mold assembly 12 provides the initial encasing and protecting of electrical components such as the example electrical conductors 18, and also can be utilized to protect other electrical devices such as printed circuit boards, specialized intergraded circuits, capacitors, inductors or any other electrical or magnetic device. The pre-mold assembly 12 includes the positioning pins 14 that provide for the accurate positioning of the conductors 18 within the final overmold material 24.

The pre-mold assembly 12 includes first and second sets of ribs 16. The ribs 16 define a containment area 20. The example ribs 16 include a series of alternating peaks and valleys that encircle an outer perimeter of the pre-mold assembly 12. The confinement area 20 traps any moisture or contaminants upon entry through any seam 25 between the positioning pins 14 and the overmold material 24. Contaminants or moisture is contained within the containment area 20 disposed between the ribs 16. In this way the pins 14 are configured as a simple cylinder or other shape that is conducive to the positioning of the overmold assembly 12 within the mold 26. This eliminates the need for complex designs and shapes of the positioning pin thereby simplifying the design of the positioning pin 14.

Figure 2:
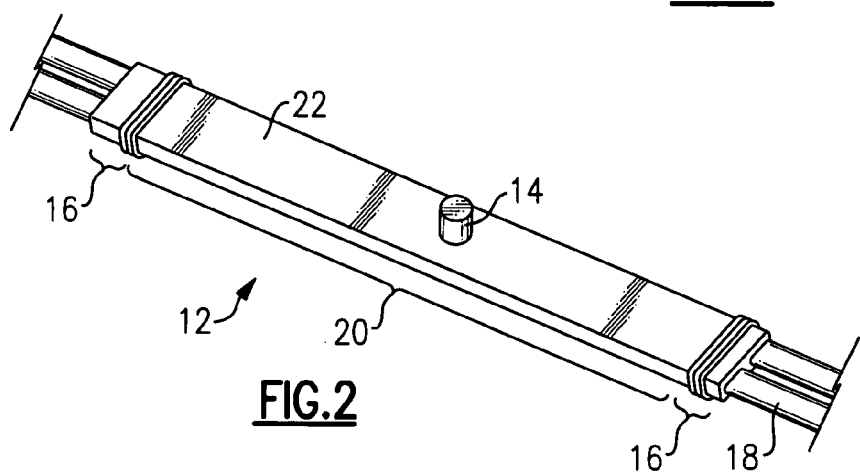
FIG. 2 is a perspective view of a pre-mold assembly according to this invention.

Referring to FIG. 2, a perspective view of the pre-mold assembly 12 is illustrated without the overmolding material 24. The positioning pin 14 is exposed and extends outwardly from a body 22 of the pre-mold assembly 12 to abut the mold tool inner surface 28 (FIG. 1) and align the electrical conductors 18 within the mold 26 (FIG. 1). The positioning pin 14 is disposed between rib sets 16 such that the positioning pin 14 is within the containment area 20. The containment area 20 limits the area within the encapsulated assembly that is potentially exposed to moisture through the seam 25 (FIG. 1) between the positioning pin 14 and the overmold material 24.

Figure 3:
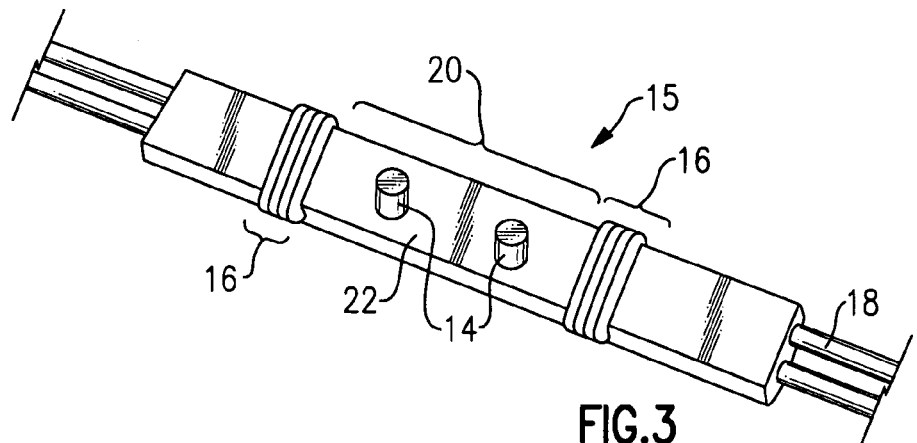
FIG. 3 is a perspective view of another example pre-mold assembly according to this invention.

Referring to FIG. 3, another pre-mold assembly 15 includes two positioning pins 14 extending from a first side within the containment area 20. As appreciated, many example positioning pins 14 can be disposed within the containment area 20 and substantially sealed off from electrical conductors and other sensitive areas with only a few sets of ribs 16. In this way, the pre-mold assembly 15 can be rigidly held in a desired location and still provide desired protection from intrusion of moisture or other contaminants.

Figure 4:
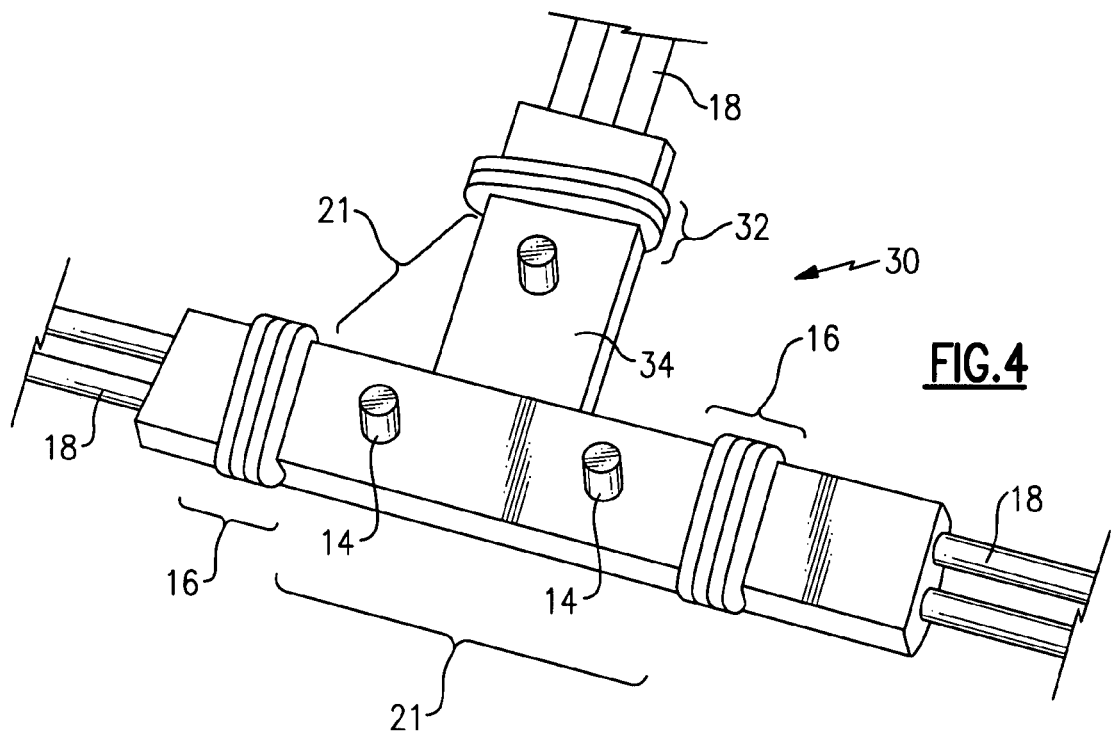
FIG. 4 is a perspective view of another example pre-mold according to this invention.

Referring to FIG. 4, another pre-mold assembly 30 is illustrated and includes electrical conductors 18 that extend therethrough. A third leg 34 extends transverse to other portions of the pre-mold body. The third leg 34 includes a third set of ribs 32 that combines with the first and second sets of ribs 16 to define an enlarged containment area 21. The containment area 21 then can include the pins 14 to provide for the proper alignment of the pre-mold assembly 30.

The example pre-mold assembly 30 illustrates the use of multiple positioning pins 14 with a few or reduced number of sealed ribs 16. Many positioning pins 14 can be provided within the containment area defined by the ribs 16 and 32. The ribs 16 and 32 combine to provide the geometry desired to contain exposure to any seam between the positioning pins 14 and the overmold.

Figure 5:
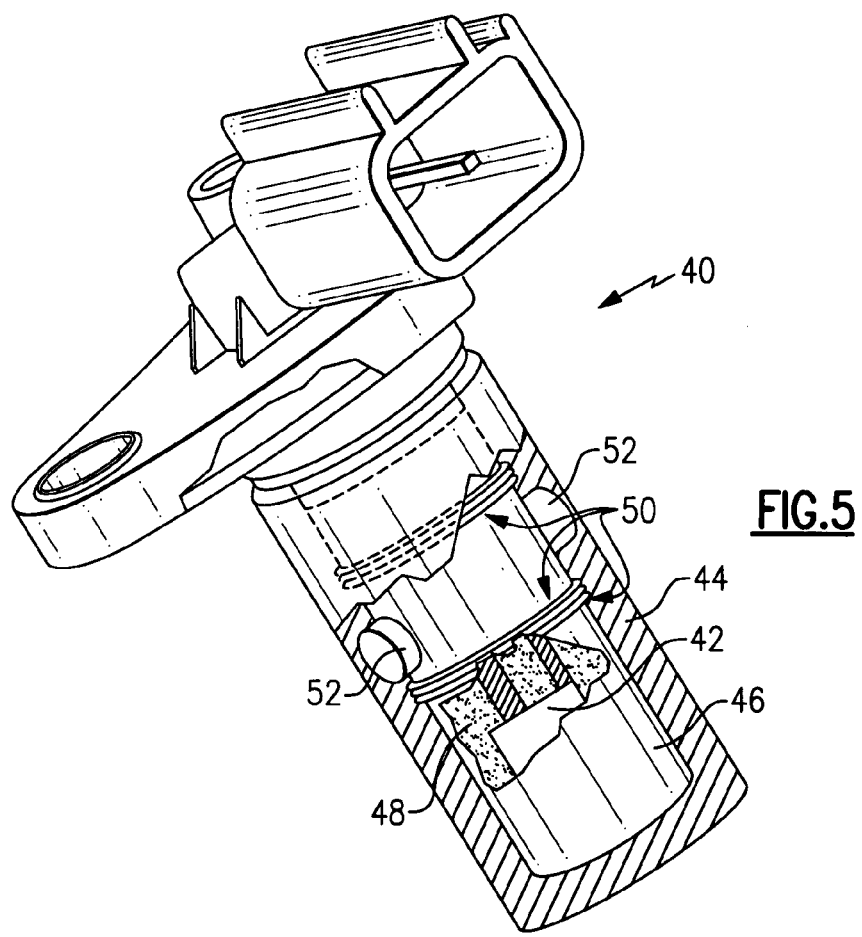
FIG. 5 is a cross-sectional view of another example pre-mold assembly according to this invention.

Referring to FIG. 5, an example electronic device assembly 40 is illustrated and includes a Hall Effect sensor 42. As appreciated, the Hall Effect sensor 42 is an electronic device that is desired to be protected from the intrusion of moisture. Although the illustrated example electronic device include a Hall Effect sensor other electronic devices are also within the contemplation of this invention such as a printed circuit board, Hall Effect IC, or a MR IC.

The pre-mold assembly 46 of this invention includes positioning pins 52 that space and align the Hall Effect sensor 42 within a mold cavity. The pre-mold 46 is then overmolded with an overmold material 44. Between the overmold material 44 and the pre-mold 46 a space or path is defined. The pre-mold assembly 46 includes two sets of ribs 50. These ribs 50 create a torturous path that prevents the intrusion of moisture or other contaminants into or to the Hall Effect sensor 42 or other electronic devices that are overmolded. The ribs 50 define a containment area within which the positioning pins 52 are disposed. Any number of positioning pins 52 may be disposed within this containment area that is defined by these ribs 50. The example ribs create the torturous path with a series of peaks and valleys that prevent moisture or other contaminants from seeping past a the containment area.

The ribs 50 prevent the intrusion of moisture or other contaminants into undesired areas of the electronic device by defining a torturous path that substantially prevents the intrusion of moisture. The ribs 50 may also be formed or a material that melts in response to the pressures and heat of the overmolding material. In other words, the first material utilized to form the pre-mold assembly 12 can be the same as the second material utilized for the overmold material 24. The same material composition for the first material and the second material would include the same melting temperatures. In such an instance, the melt ribs will be of such a thickness and/or shape as to melt and intermingle with the overmolded material. The melting of the formed ribs would occur during the molding process while the overmold material is in a molten state. The temperature of the overmold material in the molten state would cause some melting of the thinner rib sections. While other portions of the pre-mold 46 that are of thicker material will not melt to the same extent as the thinner ribs 50. Thereby, the ribs 50 will melt and intermingle with the overmolding creating a bond which forms a barrier to moisture and other contaminants into the undesired locations of the overmolded electronic device 40.

Accordingly, the pre-mold assembly provides for the containment of moisture or other contaminants that could intrude between a pre-mold and an overmold assembly at or in the proximity of positioning pins. Further, the pre-mold assembly includes sets of ribs that define a containment area within which any number of positioning pins may be disposed.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An overmolded device comprising:
    a pre-mold assembly formed from a first material, the pre-mold assembly including a positioning pin that is engageable with a surface of a mold cavity for aligning the pre-mold assembly within the mold cavity,
    a first set of ribs and a second set of ribs disposed on the pre-mold assembly on opposing sides of the positioning pin; and
    an overmold formed from a second material that encases the pre-mold assembly.

2. The assembly as recited in claim 1, wherein the first material of the pre-mold assembly comprises a material common to the second material of the overmold that encases the pre-mold assembly.

3. The assembly as recited in claim 2, wherein first set of ribs and the second set of ribs reflow responsive to overmolding of the pre-mold assembly such that at least some portion of the first material comprising the first set of ribs and the second set of ribs melt, intermingle and cure with the second material of the overmold.

4. The assembly as recited in claim 1, wherein the first material of the pre-mold assembly comprises a material different than the second material of the overmold that encases the pre-mold assembly.

5. The assembly as recited in claim 1, wherein the pre-mold assembly comprises a body and the pin extends outward from the body and the first set of ribs and the second set of ribs are formed on the body and spaced apart from the positioning pin.

6. The assembly as recited in claim 1, wherein the positioning pin includes at least two positioning pins disposed between the first set of ribs and the second set of ribs.

7. The assembly as recited in claim 1, wherein the first set of ribs and the second set of ribs define a tortuous leak path substantially preventing intrusion of moisture past either of the first set and second set of ribs.

8. The assembly as recited in claim 1, including a plurality of additional rib sets spaced apart from the positioning pin for sealing potential leak paths.

9. The assembly as recited in claim 1, wherein the first set of ribs and the second set of ribs comprise a series of peaks and valleys encircling an outer perimeter of the pre-mold assembly.

10. The assembly as recited in claim 1, wherein the first set of ribs and the second set of ribs are spaced apart from each other and define a containment area.

11. An overmolded electrical device comprising:
    an electrical device;
    a pre-mold encasing a portion of the electric device, wherein the pre-mold comprises a positioning pin disposed between at least two sets of ribs that define a containment area within the overmolded electrical device; and an overmold encapsulating at least a portion of the pre-mold.

12. The overmolded electrical device as recited in claim 11, wherein the pre-mold comprises a body from which extend the positioning pin and the at least two sets of ribs.

13. The overmolded electrical device as recited in claim 12, wherein each of the at least two sets of ribs extend from the body about an outer surface of the pre-mold.

14. The overmolded electrical device as recited in claim 11, wherein the at least two sets of ribs melt and combine with the overmold.

15. The overmolded electrical device as recited in claim 11, wherein the electrical device comprises an electrical conductor.

16. The overmolded electrical device as recited in claim 11, wherein the electrical device comprises a sensor.

17. The overmold electrical device as recited in claim 11, wherein the pre-mold comprises an electrical device carrier.

18. A method of over molding an electrical device comprising the steps of:

a) forming a pre-mold over an electrical device;
b) forming a positioning pin in the pre-mold for holding and aligning the pre-mold within a mold cavity;
c) forming at least two sets of ribs on the pre-mold spaced apart from the positioning pin to define a containment area; and
d) overmolding at least a portion of the pre-mold with a settable material.

19. The method as recited in claim 18, comprising the step of forming the at least two sets of ribs from a material that is reflowable responsive to an application of heat during the overmolding step.

20. The method as recited in claim 19, wherein the two sets of ribs comprise a shape and/or thickness determined to combine with the settable material, less than a width of the fabric panel such that the fabric panel billows as desired.

21. The method as recited in claim 18, wherein the step of forming a positioning pin comprises forming more than one positioning pin between the at least two sets of ribs.

22. The method as recited in claim 18, including the step of defining a tortuous leak path with the at least two sets of ribs.

* * * * *